(12) United States Patent
Campomanes et al.

(10) Patent No.: US 9,903,275 B2
(45) Date of Patent: Feb. 27, 2018

(54) AIRCRAFT COMPONENTS WITH POROUS PORTION AND METHODS OF MAKING

(71) Applicant: Pratt & Whitney Canada Corp., Longueuil (CA)

(72) Inventors: Marc Campomanes, Longueuil (CA); Orlando Scalzo, Montreal (CA); Alain Bouthillier, Ste-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 702 days.

(21) Appl. No.: 14/192,332

(22) Filed: Feb. 27, 2014

(65) Prior Publication Data

US 2015/0240721 A1 Aug. 27, 2015

(51) Int. Cl.
*B22F 5/00* (2006.01)
*F02C 7/18* (2006.01)
(Continued)

(52) U.S. Cl.
CPC ................ *F02C 7/18* (2013.01); *F01D 9/04* (2013.01); *F01D 25/005* (2013.01); *F01D 5/183* (2013.01);
(Continued)

(58) Field of Classification Search
None
See application file for complete search history.

(56) References Cited

U.S. PATENT DOCUMENTS 4,886,639 A 12/1989 Andrees et al.
5,353,865 A 10/1994 Adiutori et al.
(Continued)

FOREIGN PATENT DOCUMENTS

CA 2643568 9/2007
CA 2588626 11/2008
(Continued)

OTHER PUBLICATIONS

Dearden G et al, Review Article, Some recent developments in two- and three-dimensional laser forming for 'macro' and 'micro' applications, Journal of optics A, pure and applied Optics, Institute of Physics publishing, Bristol, GB, vol. 5, No. 4, Jun. 25, 2003, pp. S8-S15.
(Continued)

*Primary Examiner* — Jessee Roe
*Assistant Examiner* — Ngoclan T Mai
(74) *Attorney, Agent, or Firm* — Norton Rose Fulbright Canada

(57) ABSTRACT

A component including a porous portion which may be permeable or impermeable to air, and a method for making. In one example, the component is a cooled wall segment for a gas turbine engine, including a body defining a contact surface configured to be in contact with circulating hot gas and an outer surface configured to be in contact with cooling air. The body includes a first portion with at least one retention element, and a porous second portion made of a porous material permeable to air, containing a plurality of interconnected pores, and having a porosity greater than that of the first portion. The second portion is engaged to the first portion, defines at least part of the contact surface, and defines at least part of a fluid communication between the outer surface and the contact surface through the interconnected pores. The wall segment may be for example a heat shield or shroud segment. Methods of forming components are also discussed.

21 Claims, 15 Drawing Sheets

(51) Int. Cl.
  *F01D 25/00* (2006.01)
  *F01D 9/04* (2006.01)
  F01D 5/18 (2006.01)
  F01D 25/12 (2006.01)

(52) U.S. Cl.
  CPC .......... *F01D 25/12* (2013.01); *F05D 2230/21* (2013.01); *F05D 2230/22* (2013.01); *F05D 2260/203* (2013.01); *Y02T 50/671* (2013.01)

(56) References Cited

U.S. PATENT DOCUMENTS

| | | | |
|---|---|---|---|
| 5,487,773 | A | 1/1996 | Seyama et al. |
| 6,262,150 | B1 | 7/2001 | Behi et al. |
| 6,935,022 | B2 | 8/2005 | German et al. |
| 7,246,993 | B2 | 7/2007 | Bolms et al. |
| 7,534,086 | B2 | 5/2009 | Mazzola et al. |
| 7,597,533 | B1 | 10/2009 | Liang |
| 7,726,936 | B2 | 6/2010 | Keller et al. |
| 8,316,541 | B2 | 11/2012 | Patel et al. |
| 8,596,963 | B1 | 12/2013 | Liang |
| 2002/0037232 | A1 | 3/2002 | Billiet et al. |
| 2002/0098298 | A1 | 7/2002 | Bolton et al. |
| 2002/0129925 | A1 | 9/2002 | Dixon et al. |
| 2004/0005216 | A1* | 1/2004 | Suzumura ............ F01D 11/08 415/173.3 |
| 2004/0217524 | A1 | 11/2004 | Morris |
| 2005/0019199 | A1 | 1/2005 | Quinfa et al. |
| 2007/0202000 | A1 | 8/2007 | Andrees et al. |
| 2008/0075619 | A1 | 3/2008 | Hosamani et al. |
| 2008/0213718 | A1 | 9/2008 | Abels et al. |
| 2008/0237403 | A1 | 10/2008 | Kelly et al. |
| 2009/0304497 | A1 | 12/2009 | Meier et al. |
| 2010/0236688 | A1 | 9/2010 | Scalzo et al. |
| 2011/0016717 | A1 | 1/2011 | Morrison et al. |
| 2012/0000072 | A9 | 1/2012 | Morrison et al. |
| 2012/0136400 | A1 | 5/2012 | Benoit et al. |
| 2013/0031909 | A1 | 2/2013 | Patel et al. |
| 2013/0051979 | A1 | 2/2013 | Durocher et al. |
| 2013/0052007 | A1 | 2/2013 | Durocher et al. |
| 2013/0052074 | A1 | 2/2013 | Durocher et al. |
| 2013/0156626 | A1 | 6/2013 | Roth-Fagaraseanu et al. |
| 2013/0259732 | A1 | 10/2013 | Alexander et al. |
| 2015/0093281 | A1 | 4/2015 | Campomanes et al. |

FOREIGN PATENT DOCUMENTS

| | | |
|---|---|---|
| DE | 102012206087 | 10/2013 |
| EP | 0538073 | 4/1993 |
| EP | 1033193 | 12/2001 |
| EP | 1876336 | 1/2008 |
| EP | 2230384 | 9/2010 |
| EP | 2372087 | 10/2011 |
| GB | 2448031 | 10/2008 |
| RU | 2255995 | 7/2005 |
| WO | 0245889 | 6/2002 |

OTHER PUBLICATIONS

U.S. Appl. No. 14/656,342, filed Mar. 12, 2015.
U.S. Appl. No. 14/333,954, filed Jul. 17, 2014.
T.Hong, W. Ju, M. Wu. "Rapid Prototyping of PMMA microfluidic chips utilizing a CO2 laser." Microfluid Nanofluid (2010) 9: 1125-1133.

* cited by examiner

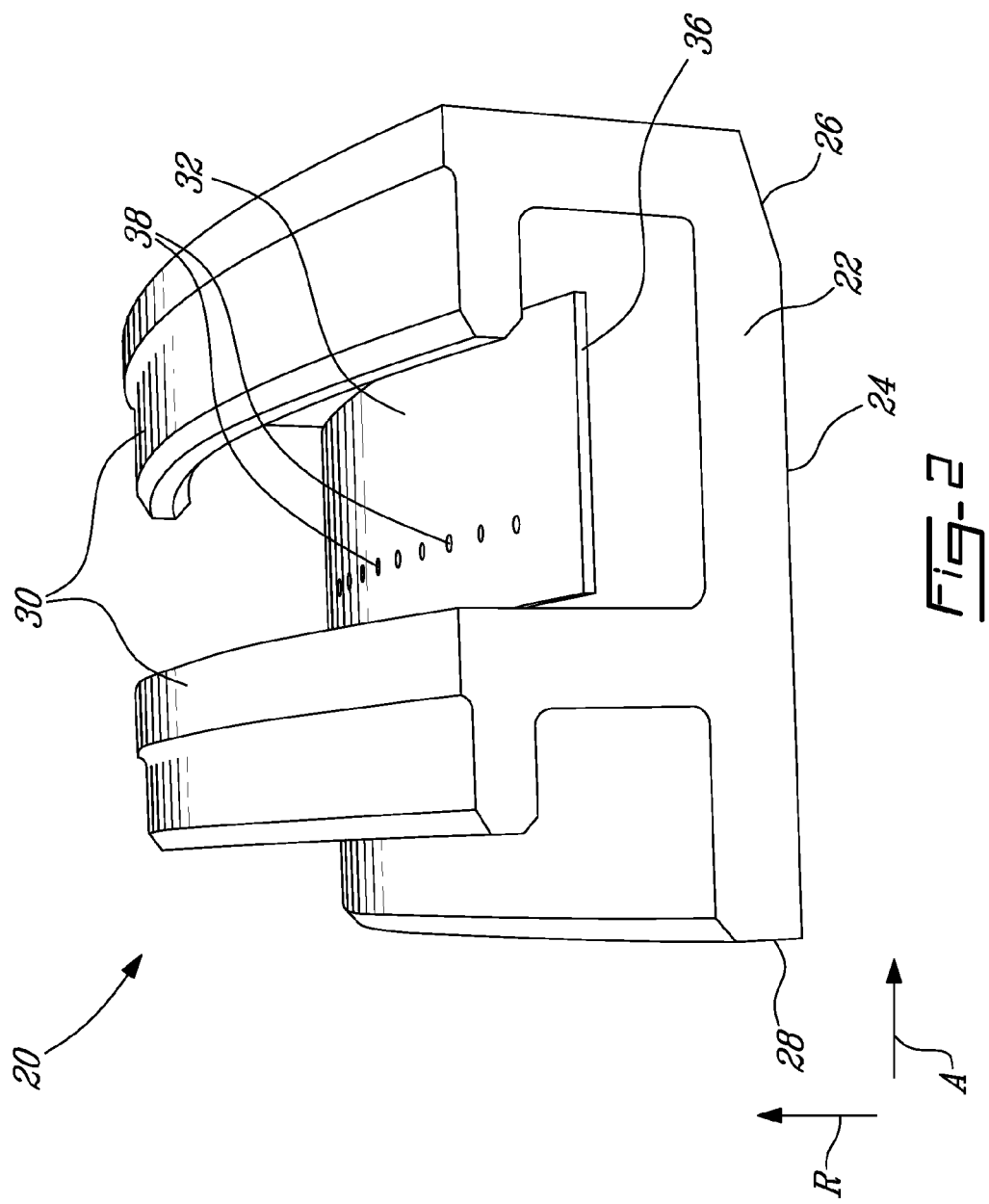

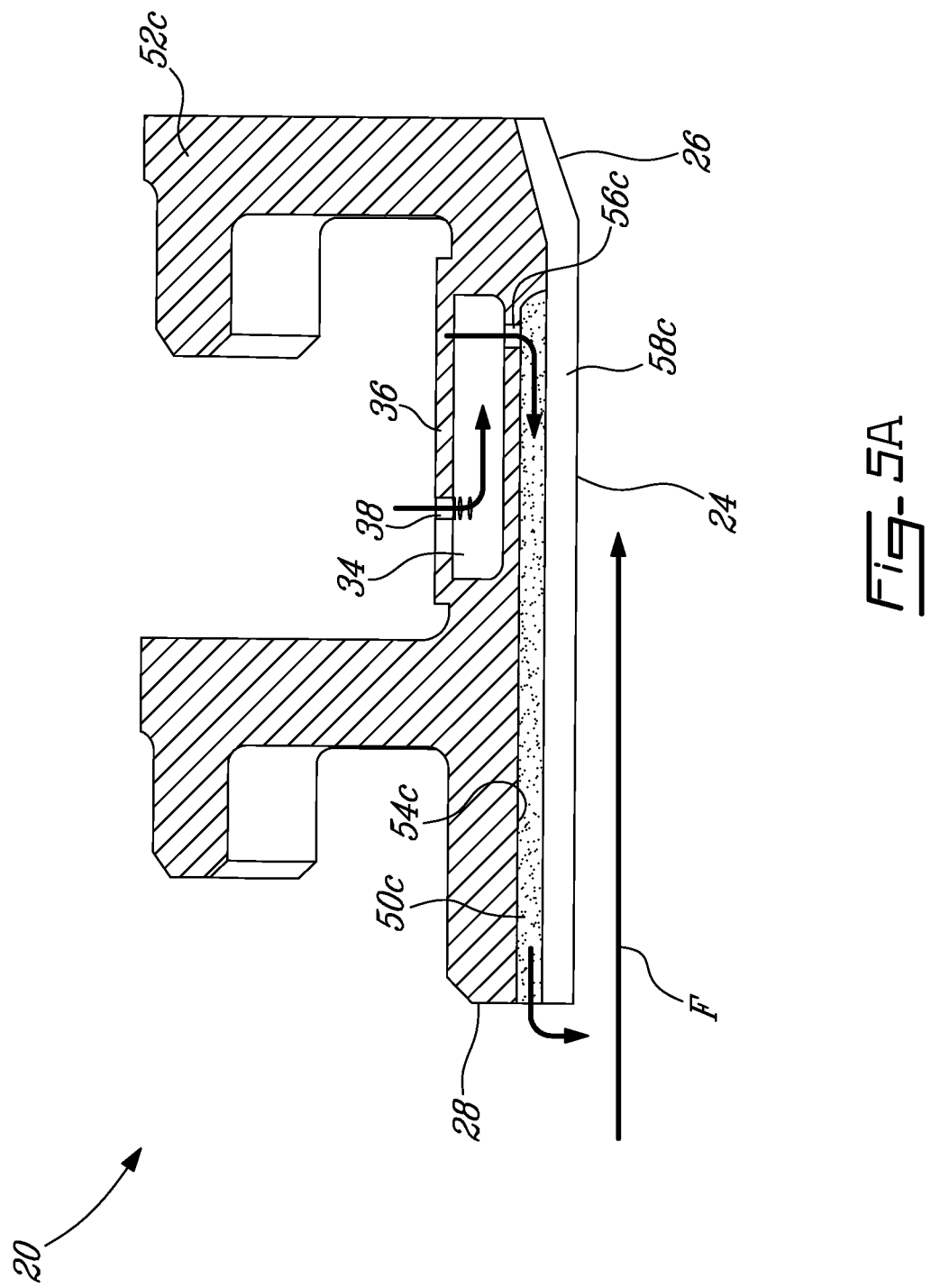

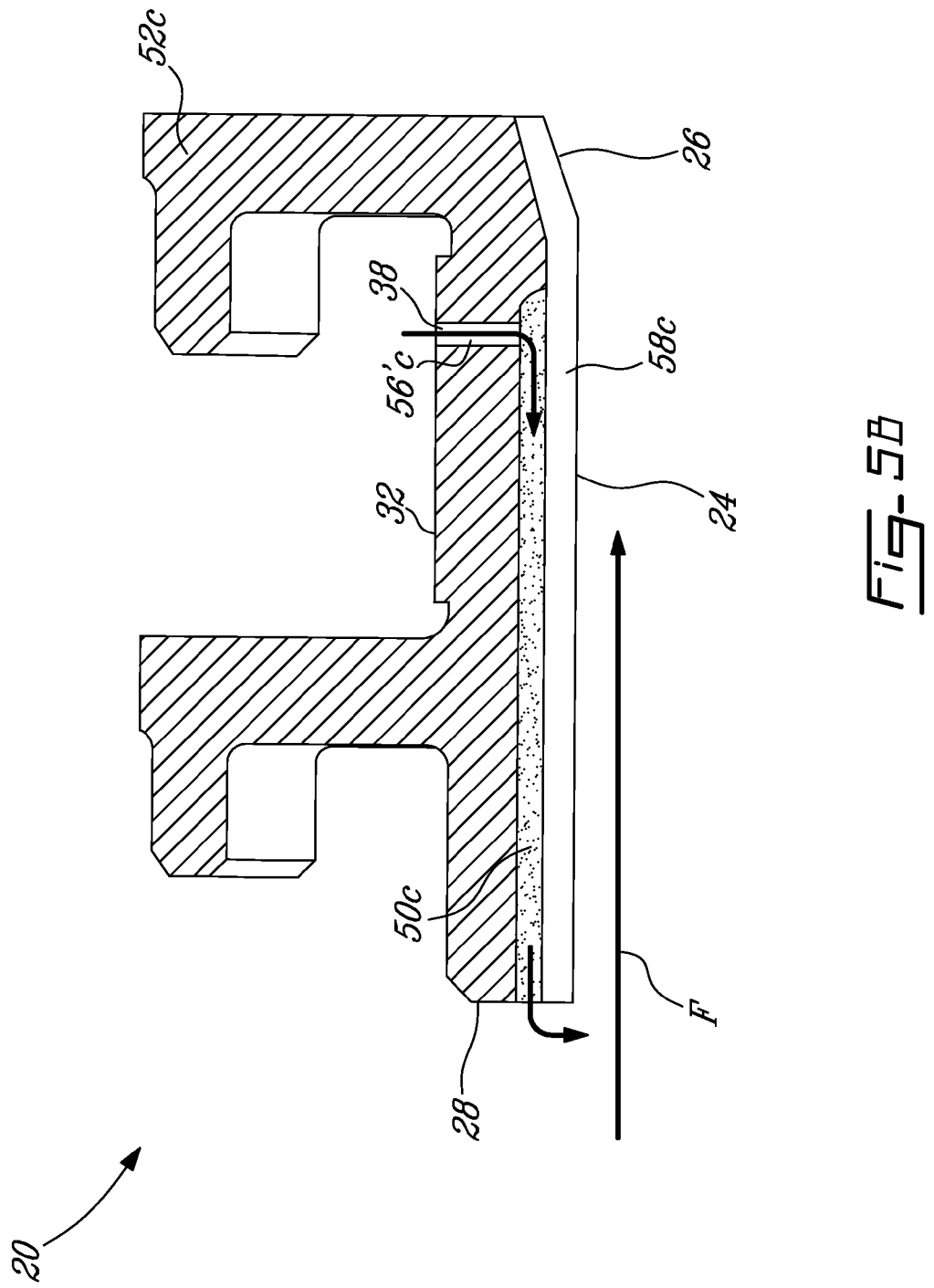

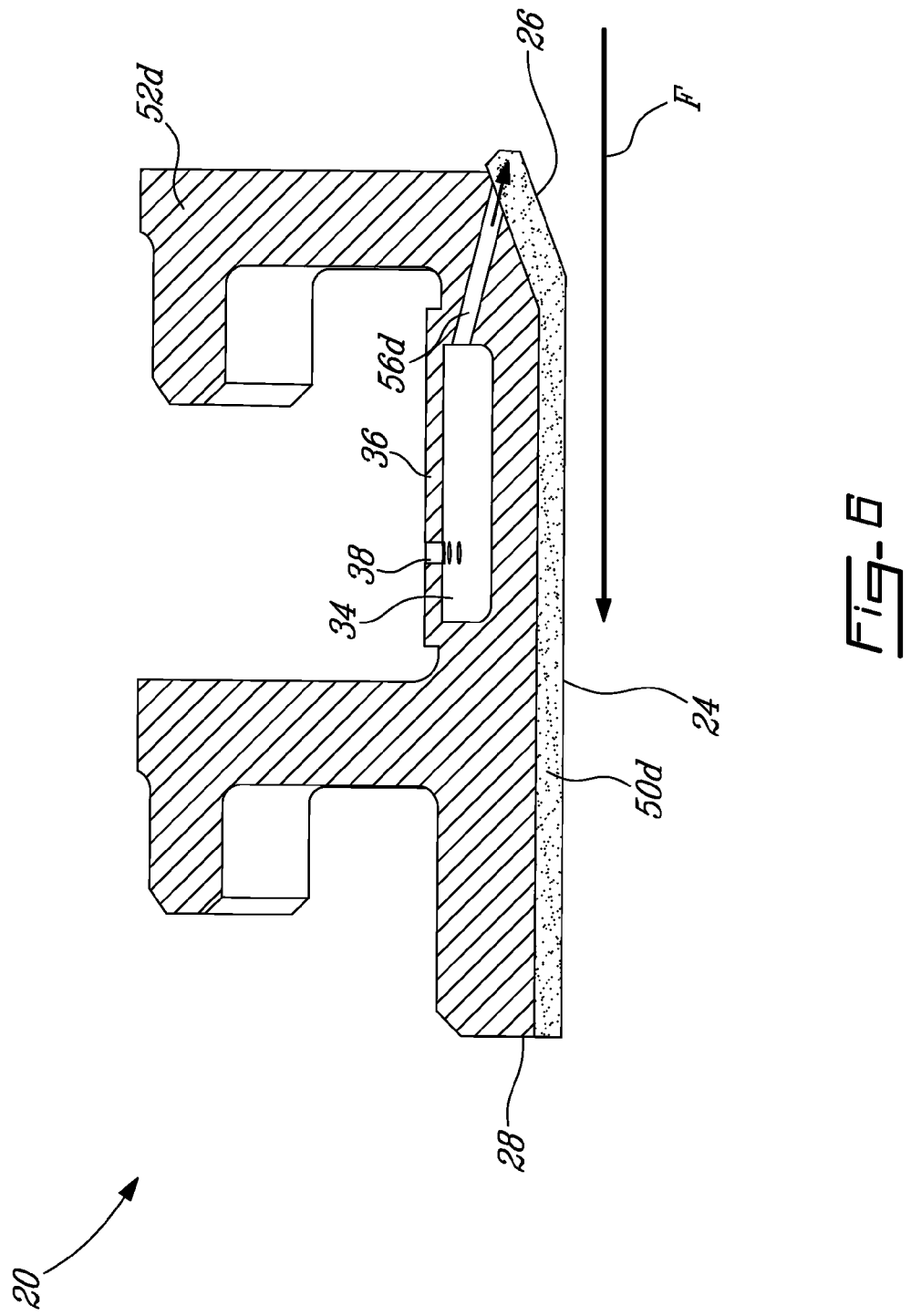

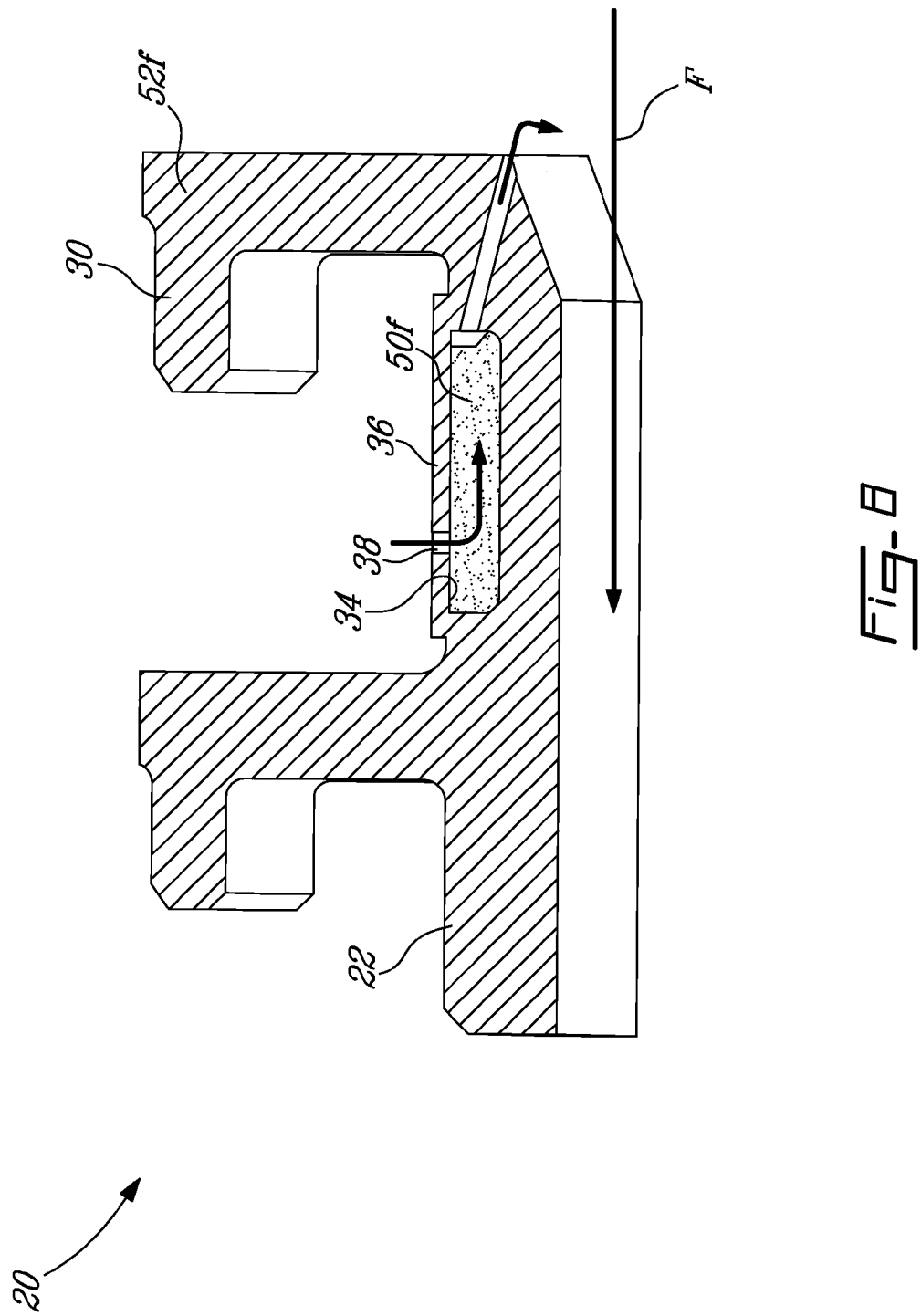

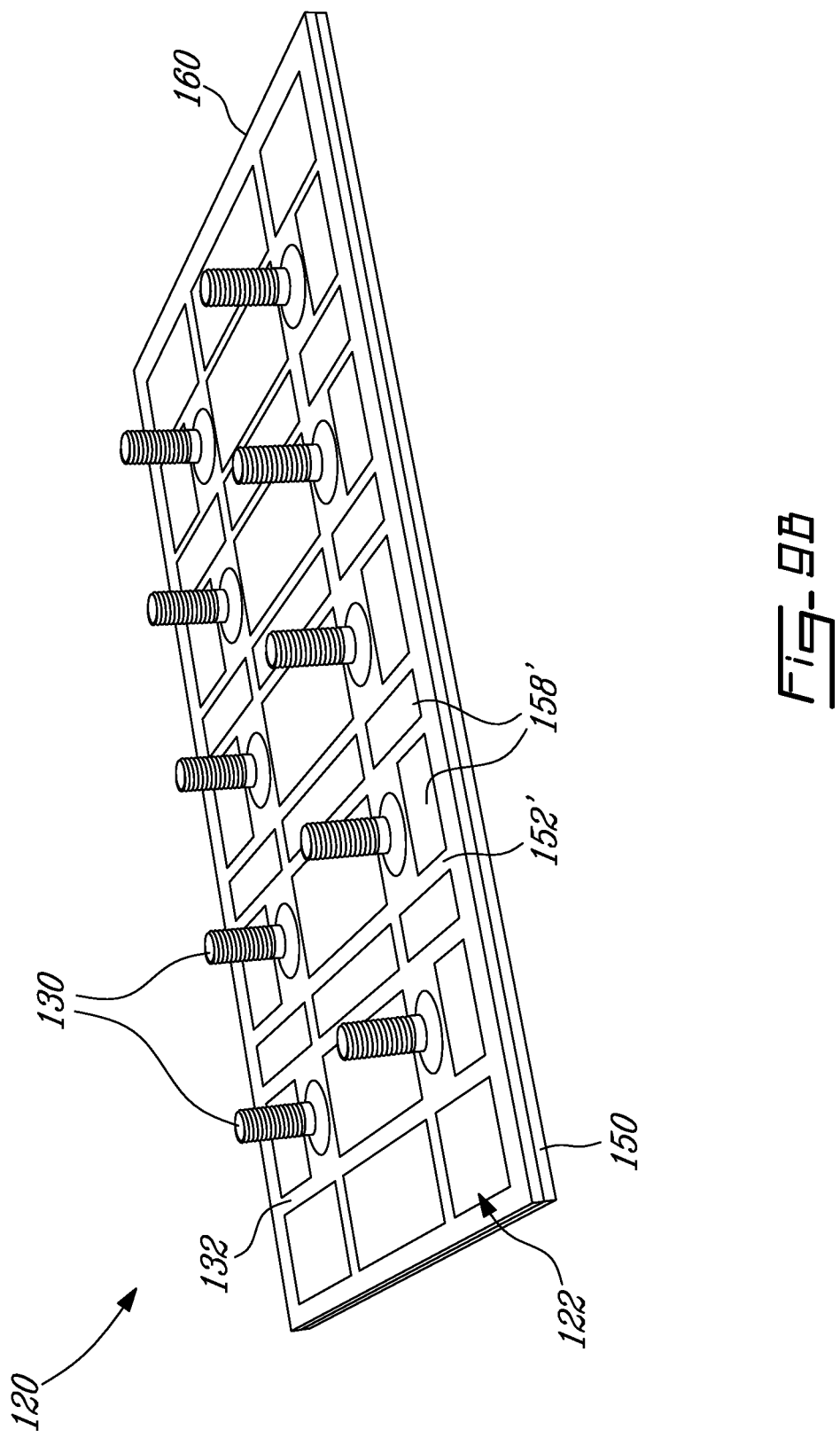

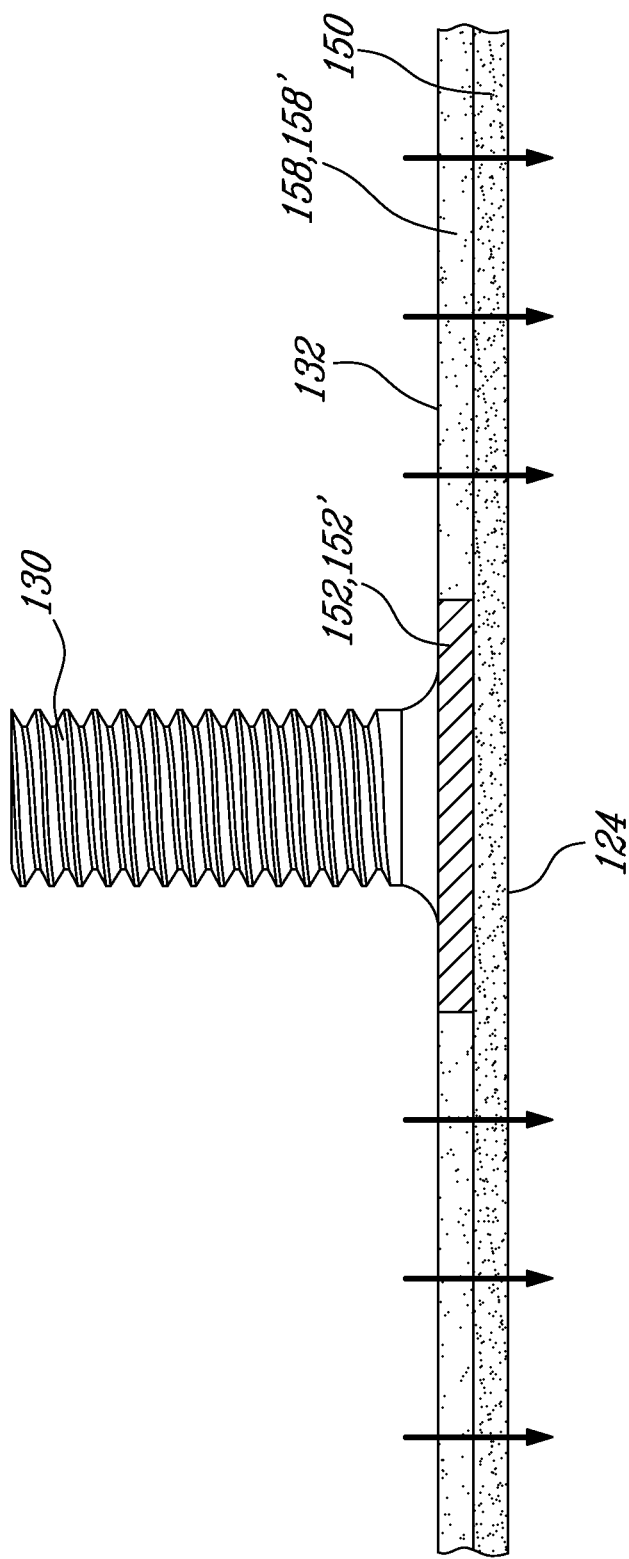

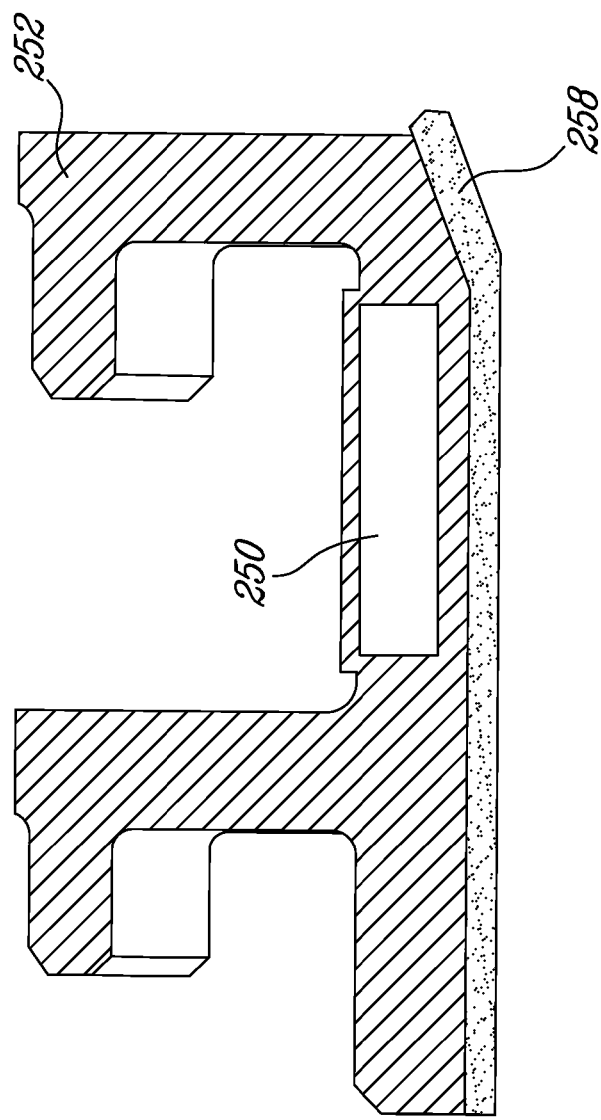

AIRCRAFT COMPONENTS WITH POROUS PORTION AND METHODS OF MAKING

TECHNICAL FIELD

The application relates generally to metal injection molding and, more particularly, to processes therefor and products of such processes.

BACKGROUND OF THE ART

Turbine shrouds and heat shields are typically provided by a plurality of holes through which cooling air is circulated, such as to cool the shroud or the heat shield for example through impingement of the cooling air. However, the number of holes which are required are typically relatively high, which may provide for a complex and/or lengthy manufacturing processes. Other engine parts are also are often subject to cooling requirements to operate at optimal efficiency. As well, aircraft parts in general benefit from weight reduction measures wherever feasible.

SUMMARY

In one aspect, there is provided a cooled wall segment for a gas turbine engine, the segment comprising: a body defining a contact surface configured to be in contact with circulating hot gas and an outer surface configured to be in contact with cooling air, the body including at least one retention element complementary to a retention element of the engine, the body having: a first portion including the at least one retention element, and a porous second portion made of a porous material permeable to air and containing a plurality of interconnected pores, the porous material having a porosity greater than that of the first portion, the second portion being engaged to the first portion and defining at least part of the contact surface, the second portion defining at least part of a fluid communication between the outer surface and the contact surface through the interconnected pores.

In another aspect, there is provided a method of forming a cooled wall segment for a gas turbine engine through a powder injection molding process, the method comprising: forming a green body of the wall segment, including: forming a first portion from a first feedstock, the first portion defining at least one retention element of the body, and forming a second portion from a second feedstock, wherein a surface of the second portion is exposed to define at least part of a contact surface of the body configured to be in contact with hot gas circulating through the gas turbine engine; and debinding and sintering the green body, such that the second feedstock defines a porous material permeable to air and containing a plurality of interconnected pores, and such that the first feedstock defines a material less porous than the material defined by the second feedstock.

In a further aspect, there is provided a method of forming a shroud segment for a gas turbine engine through a powder injection molding process, the method comprising: forming a green body of the shroud segment, including: forming a first part from a first feedstock, the first part defining an open cavity, filling the open cavity with a second part made of a second feedstock, and enclosing the second part with a third part made of the first feedstock, the third part extending over the second part and cooperating with the first part to close the open cavity; and debinding and sintering the green body while the second part supports the third part to prevent collapse of the third part within the cavity such that the second feedstock defines a porous material permeable to air and containing a plurality of interconnected pores.

In yet another aspect, there is provided a metal-injection molded component comprising a body having a first portion and a second porous portion made of a porous material, the porous material having a porosity greater than that of the first portion.

In a further aspect, there is provided a method of forming an aircraft-based component, the method comprising: metal-injection molding to form a green body, the body including a first portion molded from a first feedstock and a second portion molded from a second feedstock, wherein the first feedstock produces a first material having a density of 96.5% or more of a theoretical density of the corresponding forged material and the second material produces a second material having a porosity of equal to or more than 7%.

DESCRIPTION OF THE DRAWINGS

Reference is now made to the accompanying figures in which:

FIG. 2 is a schematic tridimensional view of a turbine shroud segment which may be used in a gas turbine engine such as shown in FIG. 1;

FIGS. 3A, 3B, 4, 5A, 5B, 6, 7 and 8 are schematic cross-sectional views of a shroud segment such as shown in FIG. 2 in accordance with different particular embodiments;

FIGS. 9A-9B are schematic tridimensional views of different heat shield panels which may be used in a gas turbine engine such as shown in FIG. 1, in accordance with particular embodiments;

FIG. 10 is a schematic cross-sectional view of a part of the heat shield panels of FIGS. 9A and 9B;

FIG. 11 is a schematic cross-sectional views of another shroud segment in accordance with another embodiment.

DETAILED DESCRIPTION

Figure 1:
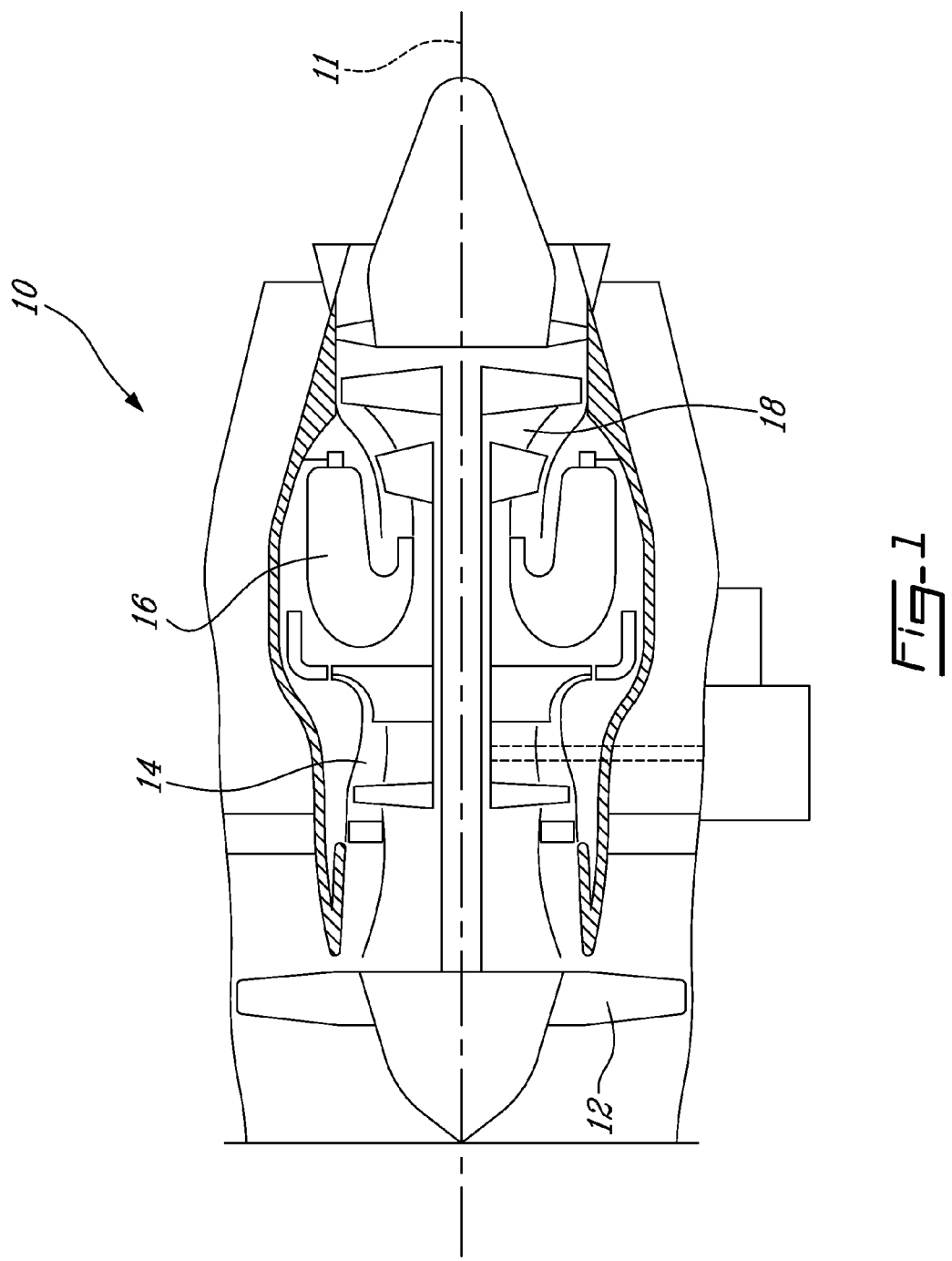
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although the engine 10 is shown as a turbofan, it is understood that the engine 10 may have a different configuration, for example a turboshaft or turboprop configuration.

The path of the various gases (air, combustion gases) through the engine 10 is determined by a plurality of wall segments enclosing that path. In the present application, the term "wall segment" is used to generally identify elements of the gas turbine engine 10 which define or enclose the path of the gases circulating through the engine thus coming into contact with these gases, including, but not limited to, elements defining and/or lining the walls of the flow path across the compressor section 14 and the turbine section 18, and elements defining and/or lining the walls of the combustor 16. Some of such wall segments are in contact with high temperature gasses and accordingly are typically cooled using e.g. compressed air exiting the compressor section 14, typically by being provided with a plurality of holes through which the cooling air circulates. Examples of such cooled wall segments include, but are not limited to, segments of a shroud surrounding the rotating rotor blades in the turbine section 18, and heat shields overlying the walls of the combustor 16.

It has been found that in some cases, cooling of such wall segments can be improved by forming part of the segment with a porous, permeable material through which the cooling air can circulate. Accordingly, in a particular embodiment the body of the wall segment includes at least two portions: a denser portion, typically made of material impermeable to air, which includes retention element(s) connecting the wall segment to the remainder of the engine 10, and a porous portion engaged to the denser portion, which defines at least part of the contact surface(s) of the wall segment coming into contact with the hot engine gases, such as an upstream part of the contact surface(s). The porous portion is made of porous material and is permeable to air to define a fluid communication allowing the cooling air to reach the contact surface(s). The cooling air may circulate through the denser portion before reaching the porous portion, for example through a plenum and/or fluid passages defined therein, or may come directly from the surrounding environment if the porous portion defines another surface of the wall segment in contact with that environment.

"Porous material" refers to a material containing a plurality of pores or voids separated by a skeletal structure. In a particular embodiment, the skeletal structure is made of solid material; alternately, the porous material may be in the form of a foam. For example, a metal foam such as a nickel foam may be suitable in some embodiments. In a porous, permeable material, the pores or voids are interconnected such as to define a fluid communication across the material through the interconnected pores. In a particular embodiment, the porous material defining the porous portion has a porosity of from about 7% to about 70%, with the porosity representing a fraction (expressed in %) of the volume of the pores or voids over a total volume of the porous portion. In a particular embodiment, the porous portion has a porosity of 70% or more.

The porous material may also be used for other purposed than cooling (e.g. reduced weight, structural integrity), and accordingly may be impermeable. Permeable porous material may also be used for purposed other than cooling.

In a particular embodiment, the denser portion has a density of 96.5% or more of the theoretical density of the corresponding forged material. The denser material may be made of non-porous material, or may be made of porous material having a lower porosity than that of the porous portion. The denser and porous portions may have the same material composition with different porosities, or may have different material compositions.

Particular examples of such wall segments are shown and described herein, but it is understood that the porous, permeable material can have various other configurations and/or be used in other types of cooled wall segments.

Referring to FIG. 2, an example of wall segment is generally shown as a turbine shroud segment 20. The turbine shroud segment 20 is configured to form part of an annular shroud surrounding rotating blades of the turbine section 18 in a gas turbine engine 10 such as the one shown in FIG. 1. The body of the shroud segment 20 generally includes a platform 22 which includes inner contact surfaces defining the gas path and coming into contact with the hot combustion gases travelling through the turbine section 18. In the embodiment shown, the contact surfaces include an intermediate surface 24 extending along or substantially along the axial direction A of the shroud, and forming a major part of the contact with the gas. The contact surfaces may further include an upstream end surface of the body, which depending on the direction of the flow may be for the embodiment shown the end surface 26 extending from one end of the intermediate surface 24 at an angle with respect to the radial and axial directions R, A such as to extend more radially outwardly as a distance from the intermediate surface 24 increases, or the radial surface 28 at the other end of the intermediate surface 24, extending along or substantially along the radial direction R of the shroud segment 20, which may be exposed to the gas in entirety or only along a radially inner portion thereof. It is understood that the particular configuration of shroud segment 20 shown and described is provided as an example only and that the configuration of the contact surface(s) may vary. For examples, both end surfaces may extend along or substantially along the radial direction R, or both end surfaces may be angled, and/or the orientation of the intermediate surface may differ from the orientation shown.

The body of the shroud segment 20 also includes two retention elements 30, shown here as hook structures having an L-shaped cross-section, extending radially outwardly from the platform 22 for engagement with an adjacent structure of the engine 10 to retain the shroud segment 20 in place. Between the retention elements 30, the platform defines an outer surface 32 opposed to the intermediate contact surface 24. In use, the outer surface 32 is exposed to cooling air from an adjacent cavity in fluid communication with the compressor section 14. In a particular embodiment, the platform 22 has a plenum 34 defined therein (not visible in FIG. 2) and includes an outer wall 36 covering this plenum to define the outer surface 32. The outer wall 36 has a plurality of openings 38 defined therethrough to provide communication between the outer surface 32 and the plenum 34. In another embodiment, the plenum 34 is omitted, and the openings 38 communicate with fluid passages through the platform 22. FIGS. 3-8 show various non-limiting examples as to how the porous portion may be incorporated into such a shroud segment 20.

Figure 3A:
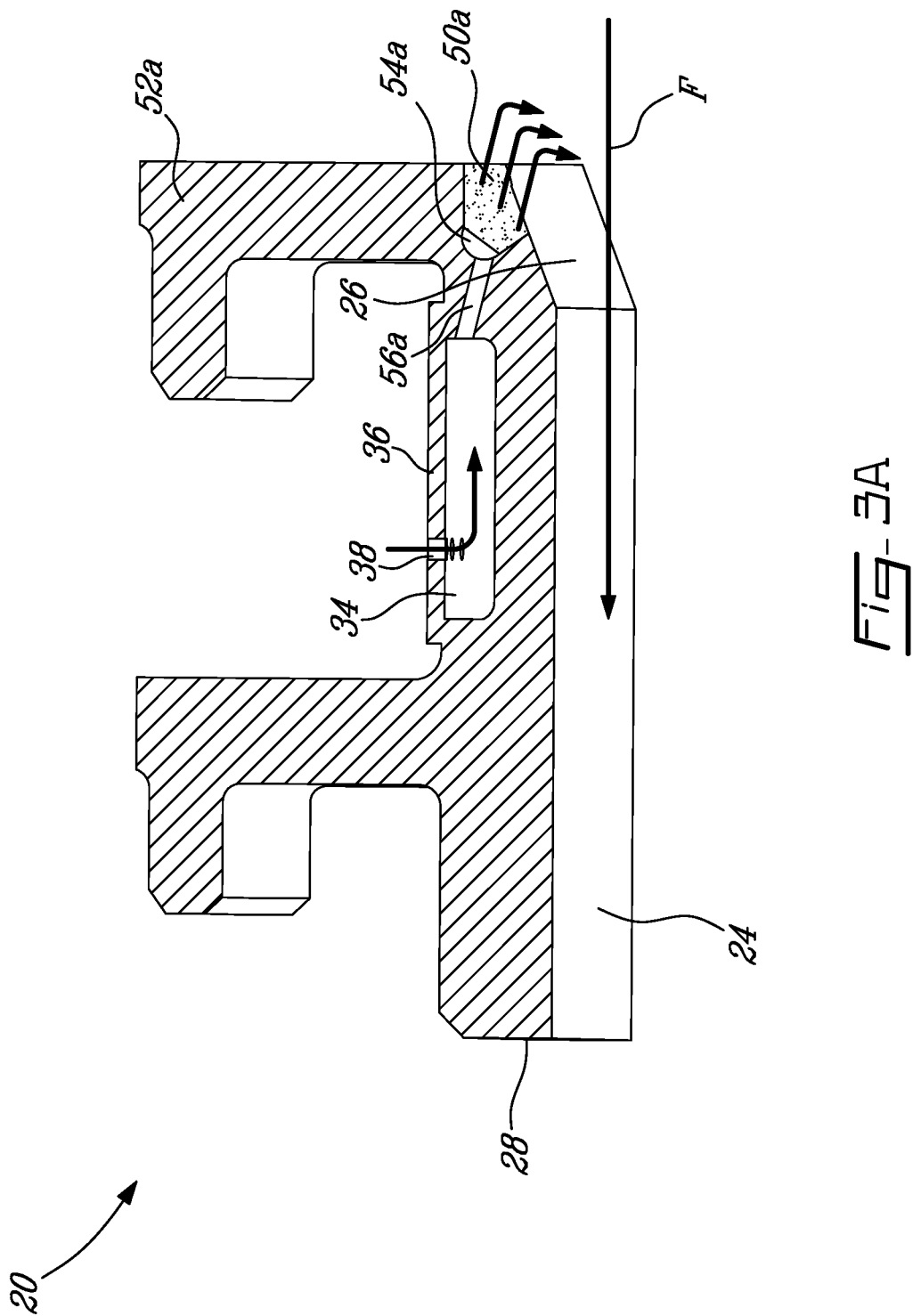

In the embodiment of FIG. 3A, the flow of combustion gases is illustrated by arrow F, such that the contact surfaces include at least the upstream end surface 26 (shown here as being angled, but may alternately extend along or substantially along the radial direction R) and the intermediate surface 24 extending therefrom. The porous portion 50a made of porous material defines an upstream part of the end surface 26, while the denser portion 52a defines a majority of the shroud segment 20 including the intermediate surface 24 and the remainder of the end surface 26. In this embodiment, the platform 22 includes a plenum 34 which is completely enclosed by the denser portion 52a. The denser portion 52a includes a cavity 54a extending from the upstream end of the end surface 26. The cavity 54a is spaced apart from the plenum 34, and the denser portion 52a includes one or more fluid passage(s) 56a providing a fluid communication between the plenum 34 and cavity 54a. The permeable porous portion 50a partially fills this cavity 54a while leaving an empty space along the communication with the fluid passage(s) 56a. The cooling air thus circulates through the openings 38 of the outer wall 36 to the plenum 34, then through the fluid passage(s) 56a to the cavity 54a, and through the material of the porous portion 50a to reach the part of the end surface 26 defined by the porous portion

50a. The cooling air then follows the flow F in the gas path to circulate along the remainder of the end surface 26 and along the intermediate surface 24.

Figure 3B:
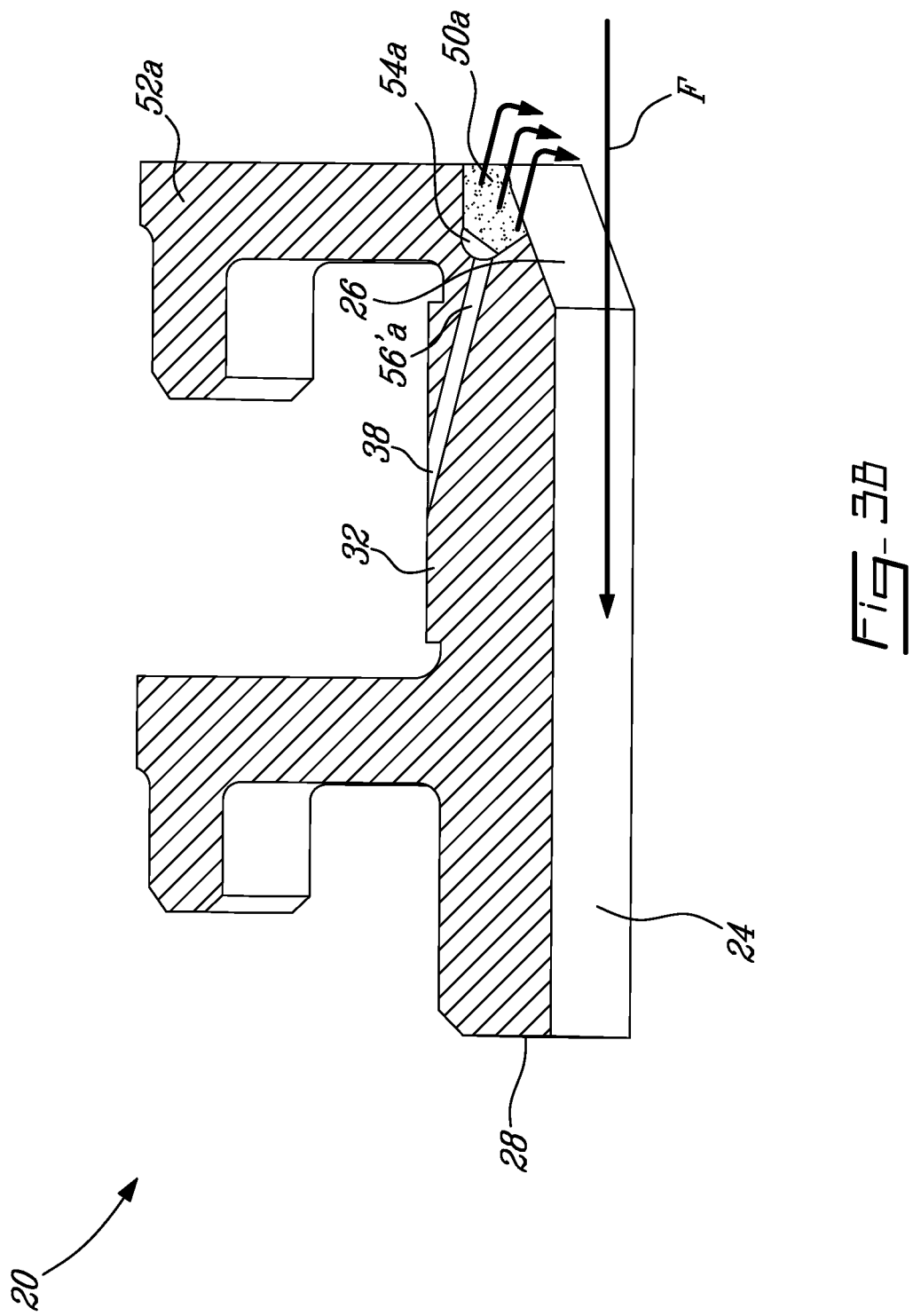

The embodiment of FIG. 3B is similar to the embodiment of FIG. 3A, except that the plenum is omitted. The fluid passages 56a' extend directly from the openings 38 in the outer surface 32 to the cavity 54a receiving the permeable porous portion 50a. The cooling air thus circulates through the openings 38 and through the fluid passage(s) 56a' to the cavity 54a, and through the material of the porous portion 50a to reach the part of the end surface 26 defined by the porous portion 50a. The cooling air then follows the flow F in the gas path to circulate along the remainder of the end surface 26 and along the intermediate surface 24.

Figure 4:
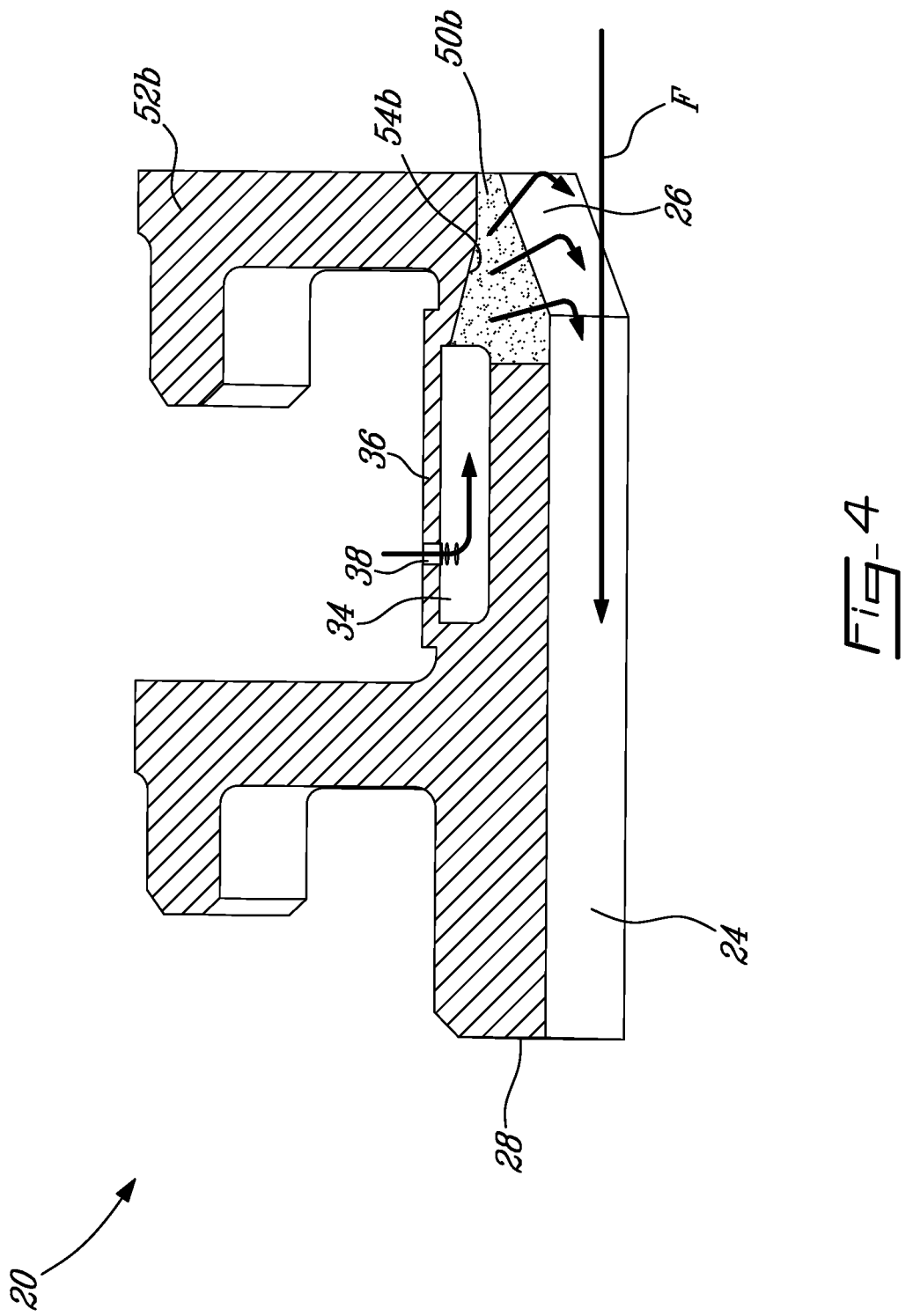

In the embodiment of FIG. 4, the contact surfaces also include at least the upstream end surface 26 (shown here as being angled, but may alternately extend along or substantially along the radial direction R) and the intermediate surface 24, as per the direction of the flow F. The porous portion 50b made of porous material defines a greater part of the shroud segment 20 than in the embodiment of FIG. 3. The denser portion 52b includes a cavity 54b extending from the end surface 26 and from an adjoining part of the intermediate surface 24, with the cavity 54b extending to connect with the plenum 34. The permeable porous portion 50b fills this cavity 54b to define the end surface 26 and the adjoining part of the intermediate surface 24 and to border part of the plenum 34. The cooling air thus circulates through the openings 38 of the outer wall 36 to the plenum 34, then directly through the material of the porous portion 50b to reach the end surface 26 and/or the part of the intermediate surface 24 defined by the porous portion 50b. The cooling air then follows the flow F in the gas path to circulate along the remainder of the intermediate surface 24.

In the embodiment of FIG. 5A, the direction of the flow F is the opposite as that of FIGS. 3-4. The contact surfaces include at least the upstream end surface 28 (shown here as extending along or substantially along the radial direction R, but may alternately be angled) and the intermediate surface 24. In this embodiment, the body of the shroud segment 20 includes an additional coating portion 58c, such as for example an oxidation resistant and/or an abradable coating, made of a material which is less permeable to air than the porous portion 50c made of porous material, and in a particular embodiment impermeable or substantially impermeable to air. Optionally, the coating portion 58c may be made of porous material having a greater porosity than the denser portion 52c. The coating portion 58c defines the downstream end surface 26 and the intermediate surface 24, as well as a radially inner portion of the upstream end surface 28. The denser portion 52c has an elongated cavity 54c defined therein along the intermediate surface 24, and the permeable porous portion 50c fills this cavity 54c to extend between the denser portion 52c and the coating portion 58c along a majority of the intermediate surface 24. The porous portion 50c is exposed at the upstream end of the shroud segment 20 and accordingly defines a part of the upstream end surface 28 extending radially outwardly of the coating portion 58c or coating.

In the embodiment shown, the platform 22 includes a plenum 34 which is completely enclosed by the denser portion 52c, and the denser portion 52c includes one or more fluid passage(s) 56c providing fluid communication between the plenum 34 and the interface between the denser and porous portions 52c, 50c. The cooling air circulates through the openings 38 of the outer wall 36 to the plenum 34, then through the fluid passage(s) 56c to and through the material of the porous portion 50c to reach the part of the upstream end surface 28 defined by the porous portion 50c. The coating portion 58c being less permeable to air than the porous portion 50c forces the air to circulate through the material of the porous portion 50c which defines the path of least resistance, thus providing cooling air along the inner surface of the coating portion 58c. The cooling air then follows the flow F in the gas path to circulate back along the coating portion 58c following the intermediate surface 24.

In alternate embodiment which is not shown, the porous portion 50c borders the plenum 34 to communicate directly therewith and the fluid passage(s) 56c are omitted.

The embodiment of FIG. 5B is similar to the embodiment of FIG. 5A, except that the plenum is omitted. The fluid passages 56c' extend directly from the openings 38 in the outer surface 32 to the interface between the denser and permeable porous portions 52c, 50c. Accordingly, the cooling air circulates through the openings 38 in the outer surface through the fluid passages 56c' to and through the material of the porous portion 50c along the inner surface of the coating portion 58c to reach the part of the upstream end surface 28 defined by the porous portion 50c, and then with the flow F in the gas path to circulate back along the coating portion 58c following the intermediate surface 24.

In the embodiment of FIG. 6, the contact surfaces include at least the upstream end surface 26 (shown here as being angled, but may alternately extend along or substantially along the radial direction R) and the intermediate surface 24, as per the direction of the flow F. In this embodiment, the porous portion 50d made of porous material is provided in the form of a coating on inner surfaces of the denser portion 52d, such as for example an oxidation resistant coating and/or an abradable coating, made of a material permeable to air. The porous portion 50d defines a major part or all of the upstream end surface 26, the intermediate surface 24, as well as a radially inner portion of the downstream end surface 28. The plenum 34 is completely enclosed by the denser portion 52d and the denser portion 52d includes one or more fluid passage(s) 56d providing fluid communication between the plenum 34 and the interface between the denser and porous portions 52d, 50d. The cooling air thus circulates through the openings 38 of the outer wall 36 to the plenum 34, then through the fluid passage(s) 56d to and through the material of the porous portion 50d to reach the upstream end surface 26. The cooling air follows the flow F in the gas path to circulate along the remainder of the upstream end surface 26 and the intermediate surface 24 and/or through the material of the porous portion 50d adjacent these surfaces 26, 24.

Figure 7:
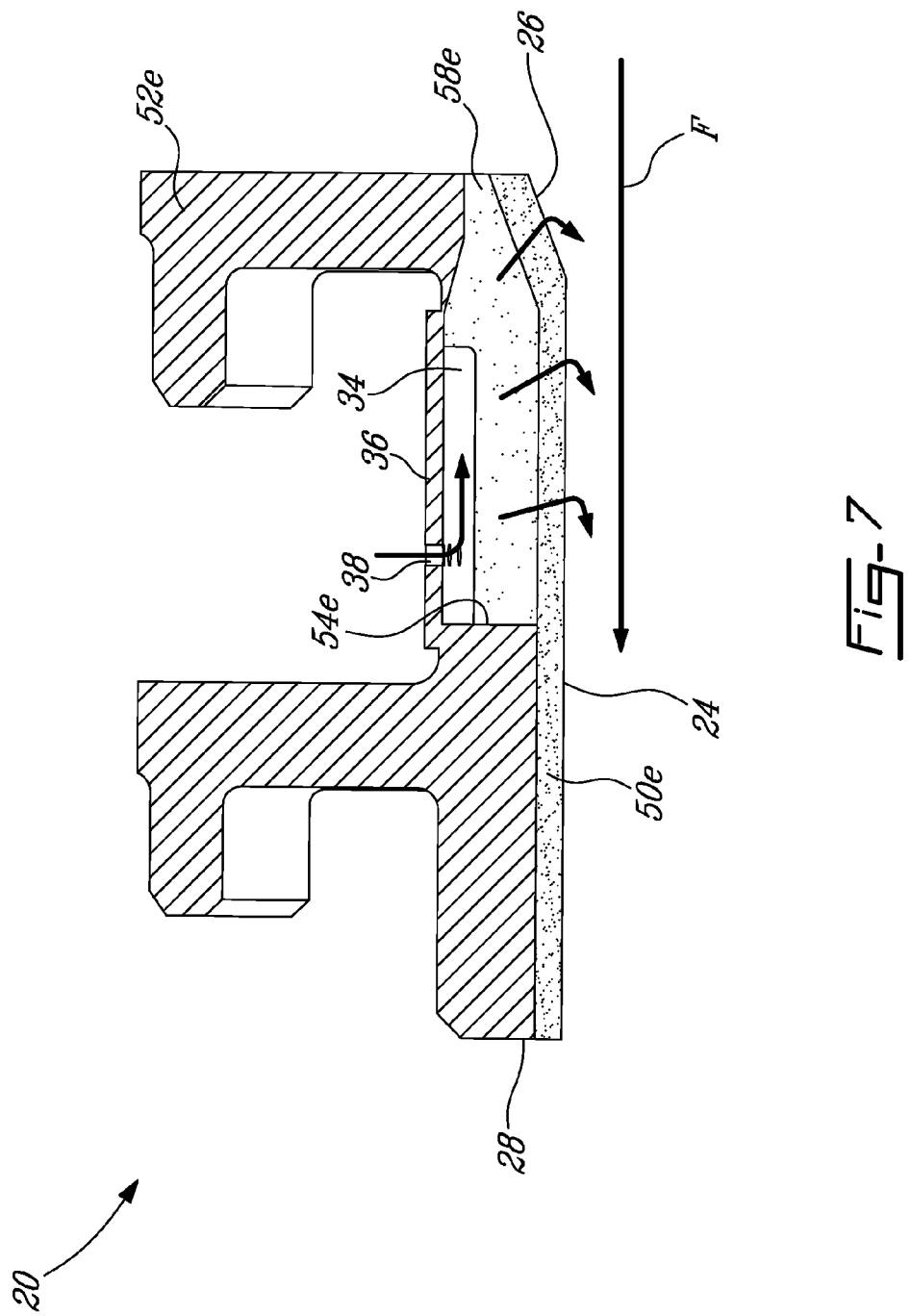

In the embodiment of FIG. 7, the contact surfaces include at least the upstream end surface 26 (shown here as being angled, but may alternately extend along or substantially along the radial direction R) and the intermediate surface 24, as per the direction of the flow F. In this embodiment, the body of the shroud segment 20 includes two porous portions 50e, 58e made of porous material.

The denser portion 52e includes a cavity 54e extending from the surfaces of the denser portion 52e corresponding to the end surface 26 and to an adjoining part of the intermediate surface 24, with the cavity 54e extending to connect with the plenum 34. An intermediate permeable porous portion 58e fills this cavity 54e to border part of the plenum 34. The denser portion 52e and the intermediate porous portion 58e thus cooperate to surround the plenum 34. An inner permeable porous portion 50e extends as a coating over the end surface of the intermediate porous portion 58e to define the end contact surface 26, and over the aligned intermediate surfaces of the intermediate porous portion 58e and of the denser portion 52e to define the intermediate contact surface 24. The inner porous portion 50e also defines a radially inner portion of the downstream end surface 28.

In one embodiment, the two porous portions 50e, 58e may be made of a same material having a same porosity and permeability, in which case the two porous portions 50e, 58e may be integrally manufactured, i.e. without apparent delimitation therebetween. In a particular embodiment, the intermediate porous portion 58e has the same material composition as the denser portion 52e but with a higher porosity, while the inner porous portion 50e has a different material composition appropriate to define an oxidation resistant coating and/or an abradable coating. Both porous portions 50e, 58e are permeable to air. In a particular embodiment, the intermediate porous portion 58e is more permeable to air than the inner porous portion 50e, for example to facilitate air distribution through the inner porous portion 50e forming the coating. The cooling air thus circulates through the openings 38 of the outer wall 36 to the plenum 34, then to and through the material of the intermediate porous portion 58e and through the material of the inner porous portion 50e to reach the end surface 26 and/or the upstream part of the intermediate surface 24 aligned with the intermediate porous portion 58e. The cooling air then follows the flow F in the gas path to circulate along the remainder of the intermediate surface 24 and/or through the material of the inner porous portion 50e adjacent the intermediate surface 24.

Referring to FIG. 8, the plenum 34 may also be filled by the porous portion 50f made of porous material, and permeable to air. This variation may be used with any of the above described embodiment where the porous material defines one or more of the contact surfaces.

Although in the embodiment shown each of the denser portion 52a,b,c,d,e,f and the porous portion 50a,b,c,d,e,f are one piece portions, it is understood that alternately one or both of these portions may be made from two or more pieces which may be spaced apart in the body of the shroud segment 20. For example, the porous portion 50a,b,c,d,e,f may include two or more circumferentially spaced pieces with parts of the denser portion 52a,b,c,d,e,f extending therebetween, or the porous portion 50a,b,c,d,e,f may include a piece filling the plenum 34 and another piece defining one or more of the contact surfaces. Accordingly, the term "portion" is not intended to be limited to a single piece.

In a particular embodiment, the denser portion 52a,b,c,d,e,f and the porous portion 50a,b,c,d,e,f are made of an appropriate type of nickel based super alloy such as Inconel® or Mar-M247. Where the porous portion 50d,e is used as a coating, in a particular embodiment the porous portion is made of a different material than the denser portion 52a,b,c,d,e,f selected to obtain the desired abradability and/or oxidation protection.

In a particular embodiment, the shroud segment 20 is manufactured using a powder injection molding process, for example a metal injection molding process.

Accordingly, in a particular embodiment, the segment 20 is formed by forming a green body, including forming the denser portion 52a,b,c,d,e,f from a first feedstock to define a part of the body including the retention element(s) 30, and forming the porous portion 50a,b,c,d,e,f from a second feedstock defining a greater material porosity than that of the denser portion. In a particular embodiment, the porous material of the porous portion(s) 50a,b,c,d,e,f can be obtained by increasing powder size, limiting the amount of sintering, and/or adjusting solid loading with respect to the material of the denser portion 52a,b,c,d,e,f. Alternately or in addition, the porous material can be obtained by adding solid particles in the feedstock that act as small cores, made of a material which is removed during the debinding cycle to create the corresponding pores.

The body is formed with a surface of the porous portion 50a,b,c,d,e,f remaining exposed to define at least part of the contact surface(s) 24, 26, 28 of the segment 20. As mentioned above, more than one porous portion may be provided.

The green body is then debound and sintered. The feedstock for the porous portion 50a,b,c,d,e,f is selected and/or the sintering parameters are selected such that the porous portion 50a,b,c,d,e,f defining the contact surface(s) is permeable to air once the sintering process is performed.

In a particular embodiment, the denser portion and porous portion(s) are co-injected. In another embodiment, the portions are injected separately, placed into contact in the green state, and connected during the debinding and/or sintering processes. In another embodiment, the denser and porous portions are injected, debound and sintered independently, and connected later such as for example using brazing.

Processes such as EDM, wire EDM, laser machining and/or chemical etching can be used to open the pores at the surface of the porous portion when such pores have been blocked during subsequent machining operations with for example cutting tools or grinding wheels.

The denser and/or porous portion may be formed in one or more pieces, which may remain separate or which may be interconnected before or during the debinding/sintering steps.

For a shroud segment having the plenum 34 filled with porous material such as shown in FIG. 8, the green body of the shroud segment 20 is formed in a particular embodiment by forming part of the denser portion 52f from a first feedstock such as to define an open cavity corresponding to the plenum 34. This part of the denser portion 52f may thus include the retention elements 30 and the majority of the part of the platform 22 made of the denser material, with the exception of the outer wall 36. The open cavity is then filled with the porous portion 50f made of a second feedstock defining a greater material porosity than that of the denser portion 52f. The porous portion 50f is then enclosed by the outer wall 36 which is made of the same feedstock as the first part and completes the denser portion 52f. The outer wall 36 thus extends over the porous portion 50f and cooperates with the remainder of the denser portion 52f to close the plenum 34 and enclose the porous portion 50f within it. The assembly of the parts may be performed through co-injection, for example by injecting the first part of the denser portion 52f, then injecting the porous portion 50f within the cavity of the plenum 34, then injecting the outer wall 36 over the porous portion 50f, or the parts may be injected separately and assembled in their green state.

Once the parts are assembled, the green body may be further processed in any suitable fashion. In one example, green body is debound and sintered. During this process, the porous portion 50f within the plenum 34 supports the outer wall 36 to prevent collapse of the outer wall 36 within the plenum 34. The sintering of the body creates an insert of permeable, porous (in this example) material extending within the plenum 34 of the shroud segment.

Figure 9A:
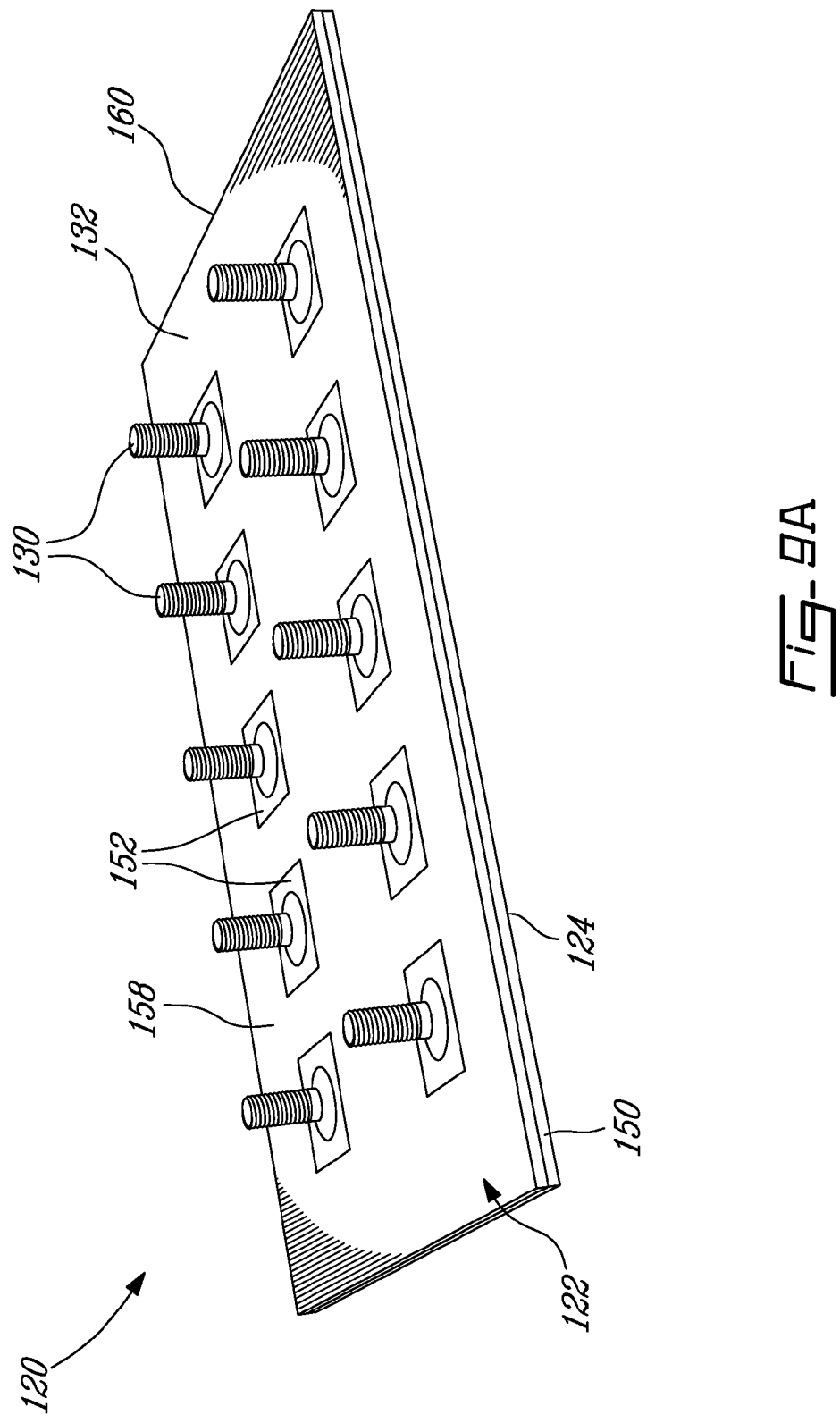

Referring to FIGS. 9A-9B and 10, another example of wall segment is generally shown as a heat shield panel 120, configured to extend inwardly of a wall of the combustor 16 in a gas turbine engine 10 such as the one shown in FIG. 1.

Although the heat shield panel 120 is shown as having a planar configuration, alternate configurations are also possible, including but not limited to an arcuate configuration.

The body of the heat shield panel 120 generally includes a platform 122 which includes an inner contact surface 124 coming into contact with the hot combustion gases travelling within the combustor 16. The body of the heat shield panel 122 also includes a plurality of retention elements 130 in the form of spaced apart threaded studs extending away from the platform 122 opposite the contact surface 124, for engagement with the wall of the combustor 16, to retain the heat shield panel 120 in place. Between the retention elements 130, the platform 122 defines an outer surface 132 opposed to the contact surface 124. In use, the outer surface 132 is exposed to cooling air coming from a plenum (not shown) in fluid communication with the compressor section 14 and entering the combustor 16 through holes in the combustor wall.

The heat shield panel 120 includes a denser portion 152, 152' and two porous portions 150, 158, 158' made of permeable porous material. In the embodiment shown in FIG. 9A, the denser portion 152 is formed by a plurality of pieces of the denser material, each piece including and surrounding one of the retention elements 130. The outer porous portion 158 cooperates with the denser portion 152 to define the outer surface 132 of the panel 120. The outer porous portion 158 is made of a single piece and extends around and between the segments of the denser portion 152 defining the retention elements 130. In the embodiment shown in FIG. 9B, the outer porous portion 158' is formed by a plurality of pieces of the porous material located between the retention elements 130. The denser portion 152' cooperates with the porous portion 158' to define the outer surface 132 of the panel 120, and includes the retention elements 130. The denser portion 152' is made of a single piece and extends around and between the segments of the outer porous portion 158'.

In a particular embodiment, a frame 160 surrounding the panel 120 is part of the denser portion 152, 152', for example to provide improved structural integrity to the panel 120. In another embodiment, the outer porous portion 158, 158' extends to the edges of the panel including the frame 160. Alternate configurations for the denser portion 152, 152' and the outer porous portion 158, 158' are also possible, depending for example on the desired strength of the heat shield panel 120.

The inner porous portion 150 is provided in the form of a coating on the inner surfaces of the combined denser portion 152, 152' and outer porous portion 158, 158', forming for example a thermal barrier coating (TBC) and/or oxidation resistant coating. Accordingly, in a particular embodiment, the denser portion 152, 152' and outer porous portion 158, 158' have the same material composition but with different porosities, and the inner porous portion 150 defining the coating has a different material composition. For example, in a particular embodiment, the denser portion 152, 152' and the outer porous portion 158, 158' are made of an appropriate type of nickel super alloy such as for example B-1900, while the inner porous portion 150 forms a thermal barrier coating and is made of an appropriate type of ceramic.

In the embodiment shown, the inner porous portion 150 defines the contact surface 124. The two porous portions 150, 158, 158' are permeable to air. In a particular embodiment, the two porous portions 150, 158, 158' have similar permeability, which depending on the relative geometry (e.g. relative thickness) may be achieved through different porosities. Accordingly, a fluid communication between the parts of the outer surface 132 defined by the outer porous portion 158, 158' and the contact surface 124 is defined through the material of the porous portions 150, 158, 158'.

In another embodiment (not shown) where the coating is not necessary, the heat shield panel 120 may be defined by the combination of the outer porous portion 158, 158' and denser portion 152, 152' only, i.e. the inner porous portion 150 may be omitted. Accordingly, in this embodiment the contact surface 124 is defined in part by the outer porous portion 158, 158', and fluid communication between the parts of the outer surface 132 and of the contact surface 124 defined by the outer porous portion 158, 158' is defined through the material of that porous portion 158, 158'.

In a particular embodiment, the porous portion(s) can provide cooling analogous to that provided through the plurality of holes typically defined through a similar solid heat shield panel, which may provide for a more desirable manufacturing process. The heat shield panel may be formed using a metal injection molding process similar to that of the shroud segment described above.

Referring to FIG. 11, an aircraft-based component 220 includes a porous insert 250, entirely embedded in the component made of denser or non-porous material 252 in this example, which may add structural rigidity to the component and/or may lower the overall density of the component. The porous insert 250 in this example may be permeable or impermeable to air. The component 220 in this example need not be a turbine shroud as illustrated, but may be any component suited for use on a gas turbine engine or aircraft-based use, where weight savings/density reduction, structural rigidity, and/or other characteristic(s) of such an arrangement may be desired. The component 220 may include a porous coating 258, which may be permeable or impermeable to air, and made of the same or of a different material than the insert 250. The coating may also be omitted.

Figure 12B:
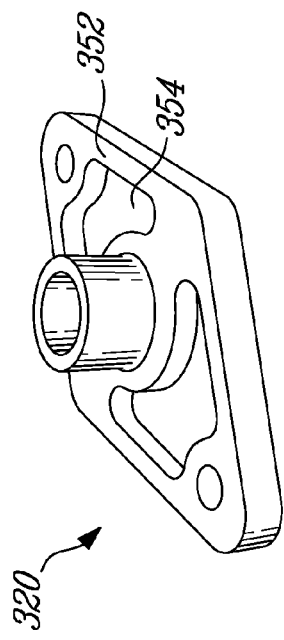
FIGS. 12A, 12B, 12C and 12D are schematic tridimensional views of structural flanges which may be used in a gas turbine engine such as shown in FIG. 1, in accordance with particular embodiments.

Various components having a porous portion may be made through a metal injection molding process. For example a structural flange 320 used for example to connect a tube to the boss on a sheet metal liner may include a porous portion including one or more piece(s). To make such a flange 320, in one example and as shown in FIG. 12B, a first portion of the flange 320 made of denser or non-porous material 252 is provided with pockets 354, for example for weight reduction purposes. Referring to FIG. 12C, the pockets 354 are filled with a porous insert 350, providing a second portion of the component 320. This provides a weight reduction but maintains a higher strength than the empty pockets. In a particular embodiment, the flange 320 is used in the form shown in FIG. 12C, i.e. with the porous portion 350 exposed.

Figure 12D:
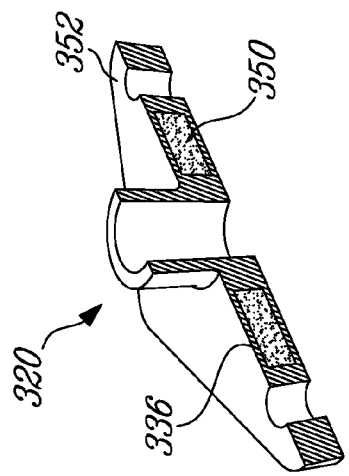
Figure 12A:
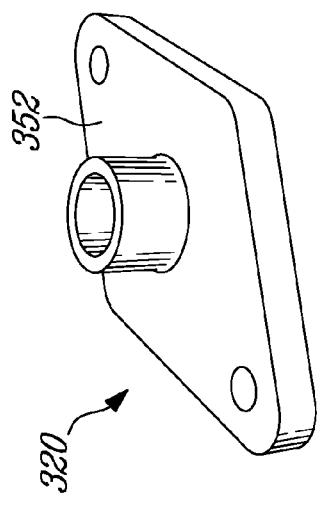
Figure 12C:
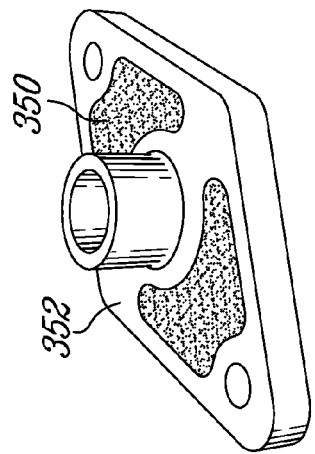

Optionally, and as shown in FIGS. 12D and 12A, a cover 336 may be added, for example made of the denser or non-porous material 252 and connected to the remainder of the flange 320 by co-debinding, to embed the insert 350. By providing the insert 350 within the first portion 352, this may provide a weight reduction, but maintain a higher strength component versus a comparable one with empty pockets. In one embodiment, the insert 350 prevents the cover 336 from collapsing during debinding and sintering of the component.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of forming a cooled wall segment for a gas turbine engine through a powder injection molding process, the method comprising:
   forming a green body of the wall segment, including:
      forming a first portion from a first feedstock, the first portion defining at least one retention element of the body, and
      forming a second portion from a second feedstock, wherein a surface of the second portion is exposed to define at least part of a contact surface of the body configured to be in contact with hot gas circulating through the gas turbine engine; and
   debinding and sintering the green body, such that the second feedstock defines a porous material permeable to air and containing a plurality of interconnected pores, and such that the first feedstock defines a material less porous than the material defined by the second feedstock.

2. The method as defined in claim 1, debinding and sintering the green body includes interconnecting the first and second portions.

3. The method as defined in claim 1, wherein forming the second portion includes disposing the second portion as a coating on the first portion to define at least part of the contact surface.

4. The method as defined in claim 1 further comprising applying a thermal barrier coating to the cooled wall segment.

5. The method as defined in claim 1, wherein the second portion has a lower density than the first portion.

6. The method as defined in claim 1, wherein the second feedstock defines the porous material with a porosity of equal to or less than 70%.

7. The method as defined in claim 1, wherein the second feedstock defines the porous material with a porosity of equal to or more than 70%.

8. The method as defined in claim 1, wherein the material defined by the first feedstock is impermeable to air.

9. A method of forming an aircraft-based component, the method comprising:
   metal-injection molding to form a green body, the body including a first portion molded from a first feedstock and a second portion molded from a second feedstock, wherein the first feedstock produces a first material having a density of 96.5% or more of a theoretical density of the corresponding forged material and the second feedstock produces a second material having a porosity of equal to or more than 7%.

10. The method of claim 9 wherein a surface of the second portion is exposed to define at least part of an exterior surface of the body.

11. The method of claim 9 wherein the second material is permeable to air and comprising a plurality of interconnected pores.

12. The method of claim 9 wherein the second material is impermeable to air.

13. The method of claim 9 further comprising enclosing the second portion within the first portion by a third portion, the third portion extending over the second portion and cooperating with the first portion to enclose the second portion.

14. The method of claim 9 wherein the third portion is molded from the first feedstock.

15. The method of claim 9 further comprising debinding and sintering the green body.

16. The method of claim 9 further comprising applying a thermal barrier coating to the component.

17. The method of claim 9 wherein the second portion has a lower density than the first portion.

18. The method of claim 9, wherein the second material has a porosity of equal to or less than 70%.

19. The method of claim 9, wherein the second material has a porosity of equal to or more than 70%.

20. The method of claim 9, wherein the aircraft-based component is a shroud segment for a gas turbine engine, wherein metal injection molding to form the green body includes forming the first portion to define an open cavity, filling the open cavity with the second portion, enclosing the second portion with a third portion made of the first feedstock, the third portion extending over the second portion and cooperating with the first portion to close the open cavity; and the method further comprises debinding and sintering the green body while the second portion supports the third portion to prevent collapse of the third portion within the cavity.

21. The method as defined in claim 9 wherein the first material is impermeable to air.

* * * * *